Jan. 23, 1934.  G. C. SNYDER  1,944,280
FABRICATED BOARD
Filed April 26, 1927   5 Sheets-Sheet 1

INVENTOR
GEORGE C. SNYDER
BY
ATTORNEY

Jan. 23, 1934.　　　　G. C. SNYDER　　　　1,944,280
FABRICATED BOARD
Filed April 26, 1927　　　5 Sheets-Sheet 2
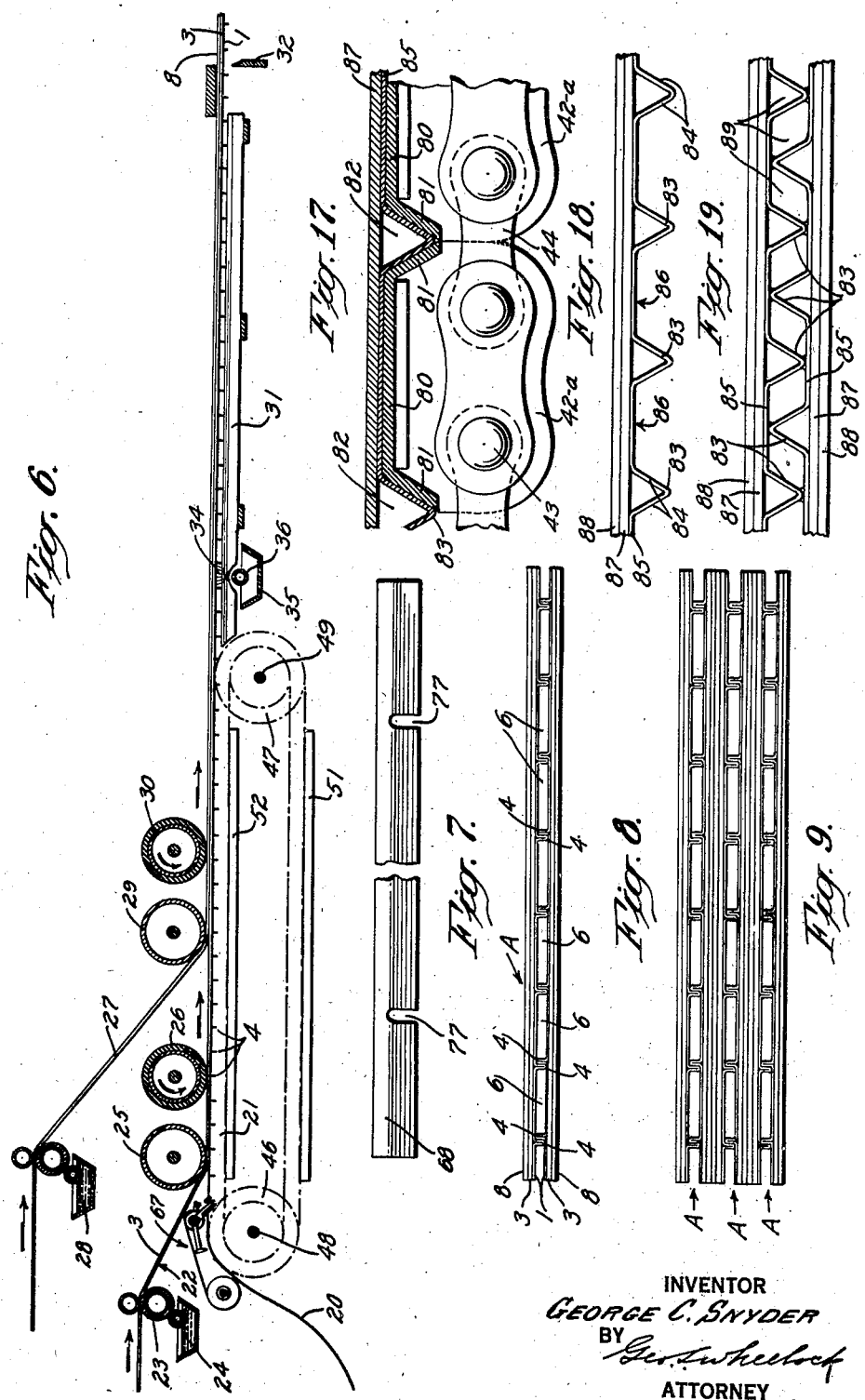
INVENTOR
GEORGE C. SNYDER
BY
ATTORNEY

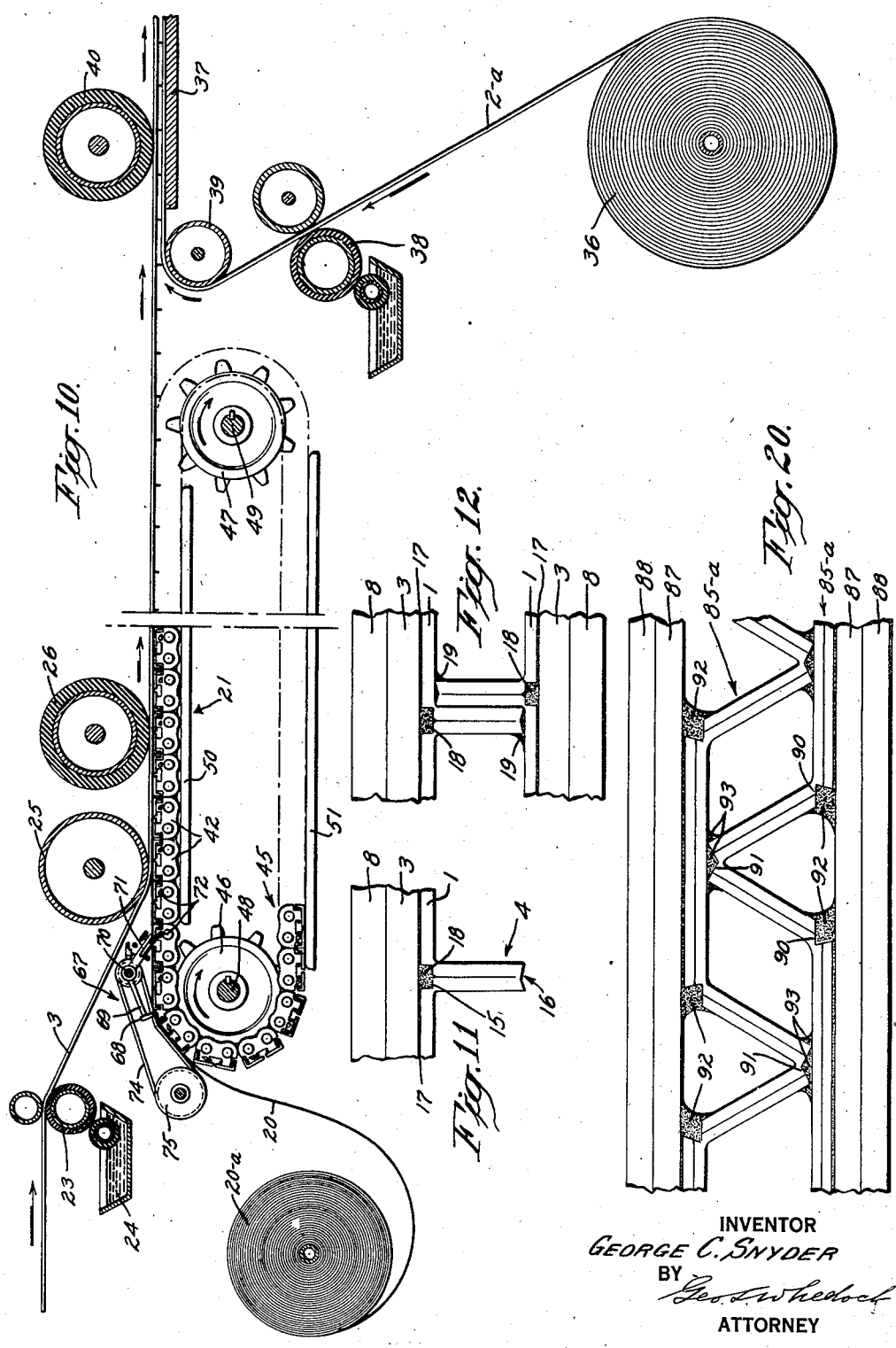

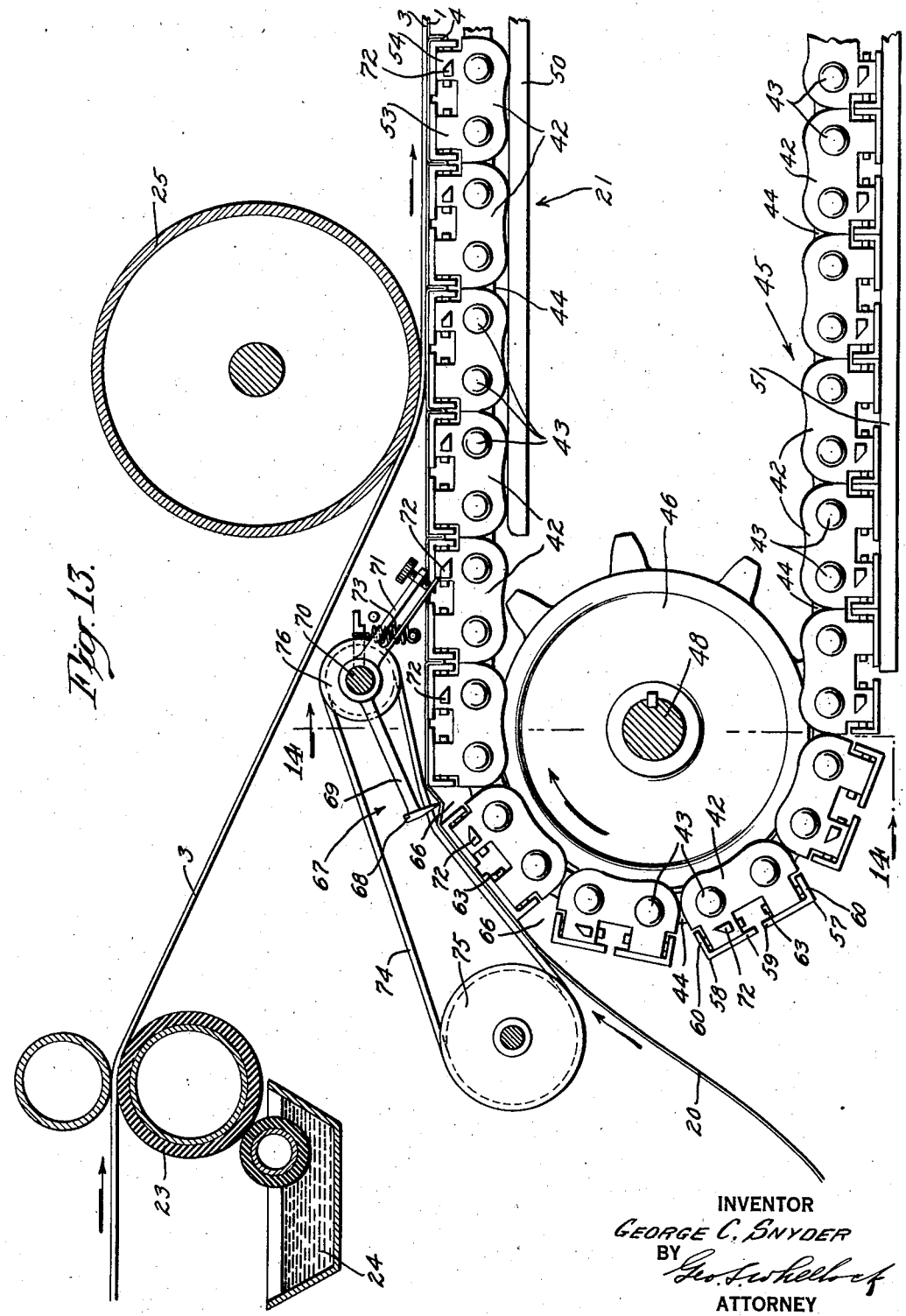

Jan. 23, 1934.                G. C. SNYDER                 1,944,280
                            FABRICATED BOARD
                         Filed April 26, 1927      5 Sheets-Sheet 5
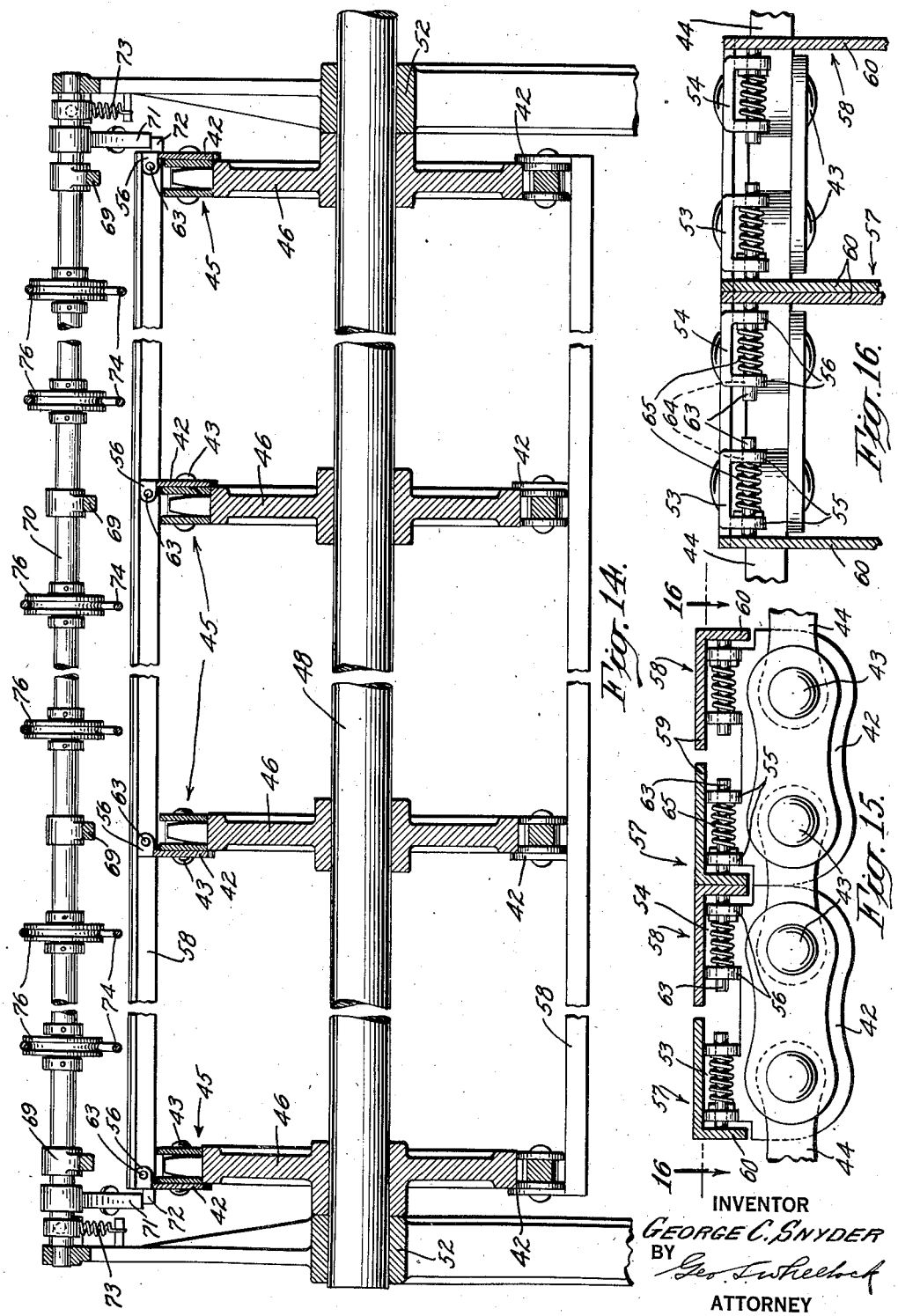
INVENTOR
GEORGE C. SNYDER
BY
                    ATTORNEY Patented Jan. 23, 1934

1,944,280

UNITED STATES PATENT OFFICE 1,944,280

FABRICATED BOARD

George C. Snyder, Long Island City, N. Y., assignor to The Guardian Trust Company, Cleveland, Ohio, a corporation of Ohio Application April 26, 1927. Serial No. 186,750

10 Claims. (Cl. 154—55)

This invention relates to the art of fabricated board formed of sheet material such as paper, fibrous composition, metal, or composite materials, and has particular reference to laminated sheet materials having a wide range of usefulness, for example, for the production of various types of containers, boxes, etc.; for reinforcing merchandise containers and packages; as a building material especially adapted for sheathing, wall board, insulating material, shelving, etc.; for use in the construction of interior parts of ships, railway cars, furniture, cabinets, etc.; and for use in countless other associations and environments. The invention further refers to improved methods of manufacture, to novel steps in the methods, and to improved machinery for carrying out the improved methods in the practice of the invention.

Among the objects of the invention, in its broader aspects, are the following: To provide a fabricated board of relatively light weight with substantial rigidity and mechanical strength; to provide such a board with a higher degree of insulating properties than is common to prior art boards; to provide such a board which will be durable in service, capable of desired surface embellishments, and economical to manufacture; to provide a rapid continuous method for manufacturing the improved fabricated board in web form; to provide such a method wherein laminations are automatically secured together in superimposed relation and provided with means for stiffening the resultant sheet; to provide novel steps in the method whereby portions of one of the laminations will be deflected to form integral trusses; to provide novel mechanism for carrying out the steps of the improved method; to provide such mechanism with a traveling table portion upon which the superimposed laminations will be firmly supported while being operated upon; to provide such a method and machinery adapted for use on different kinds of materials and for different thicknesses of material; to provide such a method and machinery with which the improved fabricated board may be expeditiously manufactured at low cost, and in such a manner as to constitute substantial improvements in the art.

More specifically, the invention contemplates the provision of a fabricated board from superimposed laminations of sheet material and characterized by the fact that certain of the laminations are spaced apart and provided with stiffening means which impart the desired degree of rigidity to the board and at the same time define substantial cells for insulating purposes. The stiffening means may preferably be in the form of flutes which, within the normal range of their resistance, are self-sustaining in shape and in fact form trusses or braces within the completed board. Such flutes may preferably be integral with one or more of the laminations and formed by transverse deflected portions extending away from the plane of the lamination. In one form of the invention the board may be built up of a plurality of similarly fluted laminations, with their respective stiffening flutes disposed in opposed relation.

The machinery and method employed for producing the improved fabricated board contemplates the continuous feeding of sheet material in web form over a traveling table, said table comprising a plurality of relatively movable members which are adapted to receive between them deflected portions of the traveling web and to crimp said deflected portions and maintain them in such condition during the securement thereto of another lamination. The arrangement is such that the sheet material may be transversely secured to formed lines of weakness prior to its association with said traveling table, and in conjunction with the continuously traveling table is an intermittently operating mechanism for deflecting the desired portions of the webs on their lines of weakness to initiate the formation of the flutes. Provision is made for automatically compensating for variations in thickness of the sheet material and thus rendering a single machine capable of operating upon at large variety of stock to produce fabricated boards for different purposes.

A number of different types of fabricated board have been proposed prior to this invention, some of such articles being formed of laminated paper and combinations of gypsum, plaster, asbestos, and the like, but none of these prior boards have fully met the universal requirements in the way of combined strength, lightness of weight, and insulation properties. They have been acclaimed as more desirable than wood for insulation purposes, because of the particles of air entrapped between the fibers or particles of the material from which the boards have been produced, but in the present invention the insulating qualities are very much enhanced and at the same time the weight of the board reduced while using less material built up in such a manner as to have great rigidity. This is made possible by the bracing flutes or trusses between certain of the laminations of the board, and such structure at the same time provides substantial cells for insulation purposes or otherwise.

The improved fabricated board of this invention has therefore a much wider range of usefulness than prior art boards, particularly in view of the fact that they may be conveniently produced of different sheet materials, such as paper, sheet metal, fiber, composition materials, or combinations of any bendable sheet materials. These and other objects, features and advantages will be more readily apparent from the following description when taken in connection with the accompanying drawings, wherein several forms of the invention have been shown by way of illustration, and wherein:

Fig. 6 is a diagrammatic view in longitudinal section, illustrating the method and mechanism for producing the improved fabricated boards;

Fig. 7 is a detail elevation of one of the deflecting bars employed for the purpose;

Fig. 8 is an edge view of another modified form of board wherein a pair of inner laminations with oppositely disposed stiffening ribs are employed in conjunction with outer laminations to give the desired surface finish;

Fig. 9 is a view illustrative of the method of stacking the boards, such as illustrated in Fig. 8;

Fig. 10 is a view similar to Fig. 6 but on a larger scale and showing a slightly modified form of apparatus for carrying out the invention;

Fig. 11 is an enlarged fragmentary detail view of one of the board units employed in the construction of the board of Fig. 8;

Fig. 12 is a similar view showing the board of Fig. 11 secured to a similar board with their stiffening flutes extending in opposed relation;

Fig. 13 is an enlarged edge view of the receiving end of the traveling table and its associated mechanism for forming the stiffening flutes;

Fig. 14 is a vertical transverse sectional view on the line 14—14 of Fig. 13;

Fig. 15 is an enlarged detail sectional view through several of the relatively movable elements of the traveling table;

Fig. 16 is a horizontal sectional view on the line 16—16 of Fig. 15;

Fig. 17 is a similar view to Fig. 15 but illustrating a modified form of relatively movable members for providing a different form of stiffening flute;

Fig. 18 is a fragmentary edge view of a board unit produced by the mechanism of Fig. 17;

Fig. 19 is an edge view of the board unit of Fig. 18 secured to a similar unit and with their stiffening flutes in opposed relation; and Fig. 20 is an enlarged detail view of the device illustrated in Fig. 19, showing the scoring of the sheet material as slightly exaggerated.

Figure 1:
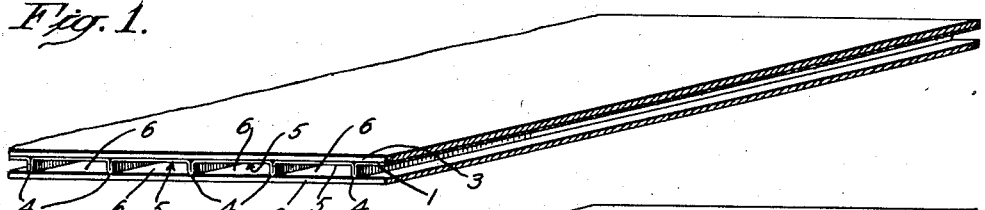
Figure 1 is a fragmentary perspective view of one form of laminated board embodying the invention.

By reference to the accompanying drawings, particularly Figs. 1 to 5, inclusive, and Figs. 8, 9, 11 and 12, it will be seen that the improved fabricated board can be made up in a number of different ways, and with various combinations of elements dependent, more or less, on special requirements for the intended purposes. The board 80 shown in Fig. 1, for example, comprises superimposed laminations 1, 2 and 3 of initially bendable sheet material permanently secured together in any suitable manner. The inner lamination 1 has a plurality of spaced stiffening ribs or flutes 4 extending outwardly from one of its surfaces, said flutes being preferably integral with the lamination and formed by deflected portions of the sheet. Between said flutes, the lamination 1 has straight portions 5 disposed in a common plane, to which the lamination 3 is secured, and the lamination 2 is secured to the outer extremities of the flutes 4. Said laminations may all be of the same material, or they may be of different materials as desired, and for some uses paper or paper board have been found desirable, while for other purposes sheet metal or combinations of sheet metal and paper, or other fibrous sheet materials, have been employed. The stiffening flutes are preferably so formed as to be self-sustaining in shape, parallel with each other, and continuous through either the length or the width of the board. The specific flutes 4 illustrated in the first form of the invention comprise co-extensive portions extending perpendicularly to the plane of the lamination, and define between them substantial cells 6 to impart the desired insulating properties.

Figure 2:
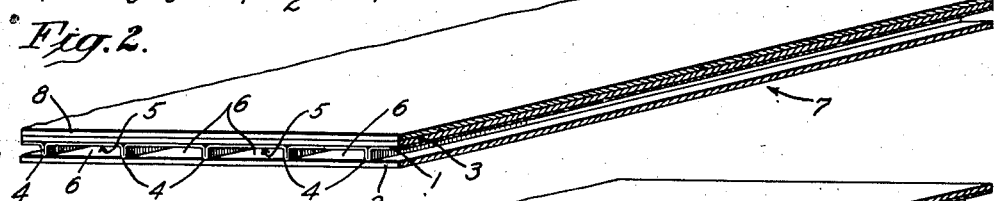
Fig. 2 is a similar view of a slightly modified form.

In Fig. 2 a slightly modified board 7 has been shown, which comprises the three laminations constructed identical with the disclosure in Fig. 1 and having in addition thereto an outer lamination 8 superimposed on the lamination 3. It will be evident that various surface finishes and embellishments may be obtained on the board by the substitution of different materials in the outer lamination 8. Thus, the improved board has increased utility because of the wide range of surface finishes which may easily be applied to it in the course of manufacture.

Figure 3:
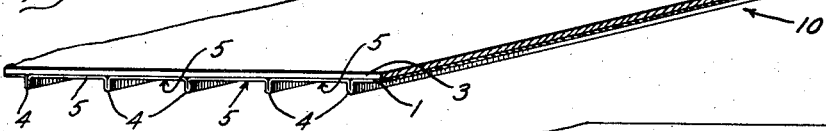
Fig. 3 is a similar view of a board having one of its surfaces provided with outwardly extending ribs or flutes.
Figure 4:
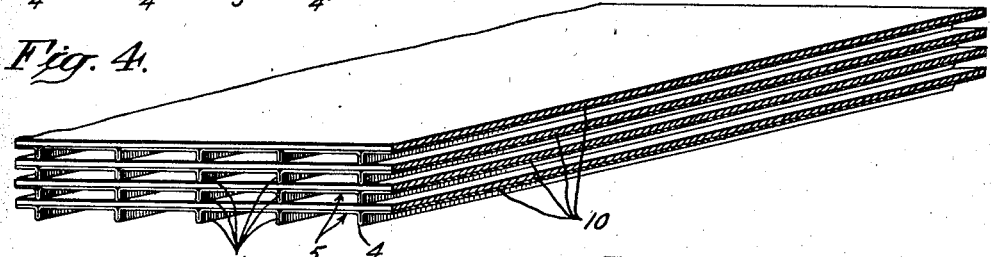
Fig. 4 is a similar view illustrating the convenient method for storing, packing, or shipping a plurality of boards such as that shown in Fig. 3.
Figure 5:
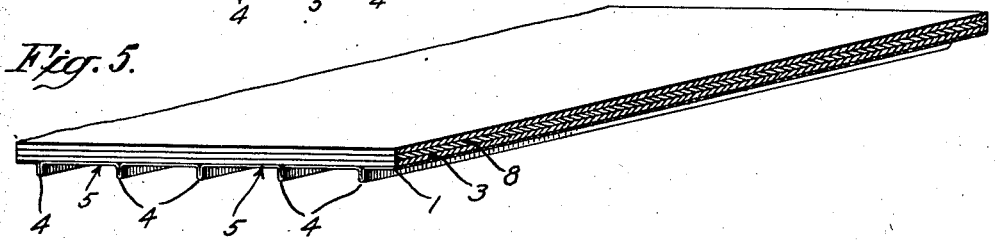
Fig. 5 is another perspective view of a modified form of the unit shown in Fig. 3, the difference residing in an increased number of laminations.

In Fig. 3 a simple board unit 10 has been shown comprising merely the laminations 1 and 3 of the board in Fig. 1, and this unit construction may preferably be produced in web form and may be used either independently, as shown, or it may be secured to the other composite webs or sheets of the same general character. For example, a plurality of the board units 10 may be superimposed upon each other, as shown in Fig. 4, and secured in permanent relation to build up a board of any desired thickness, and in this case the stiffening flutes 4 of the respective board units 10 are disposed in the same general direction. If desired, however, said board units 10 may be permanently secured together, as shown in Fig. 8, with their respective stiffening flutes 4 disposed in opposed relation. Thus, the extremities of the flutes 4 of one board unit are directly connected to the flat portions 5 of the other board unit, and the opposed stiffening flutes may be either spaced apart or disposed in contact relation side by side, as shown in Fig. 8. In producing a fabricated board such as in Fig. 8, the material is first fabricated in board units 10, as shown in Fig. 3, and cut into desirable lengths whereupon the inner or fluted surfaces of the board units may be suitably provided with an adhesive, after which they may be stacked together in pairs with their flutes in opposed relation, as shown in Fig. 9, and left that way until the adhesive has properly set.

When paper board or its equivalent is employed in the formation of the fabricated board, it may preferably be scored to provide lines of weakness for bending the sheet in the production of stiffening flutes. In Figs. 11 and 12 the results of such scoring has been indicated at 15 and 16, from which it will be evident that when the lamination 1 is secured to the lamination 3 a thin layer of adhesive 17 is applied to the opposed surfaces of said laminations and that some of the adhesive becomes exuded into the groove 18 defined by the score lines 15. The adhesive itself, when dry and set, is very strong, in most instances stronger than the material to which it is applied, and therefore said adhesive constitutes in effect a continuous binder for the adjacent flat portions 5 of the lamination 1 and at the same time serves to reinforce the lamination at its scored lines of weakness. Fig. 11 is an exaggerated view showing the adhesive binder in a single board unit 10, and Fig. 12 is a similar view showing two of such board units secured together by means of adhesive at 19 at the extremities of the stiffening flutes 4.

The improved fabricated board may preferably be produced in large quantities in a continuous process, such as is illustrated, for example, in Fig. 6. Here the sheet material 20 for the lamination 1 is fed longitudinally on a continuously moving table 21 on which portions of the sheet are deflected to form the stiffening flutes 4 and to maintain said stiffening flutes while the lining lamination 3 is applied. The sheet material for the lamination 3 may be drawn off from a stock roll, or the like, and just before it reaches the traveling table 21 its lower surface 22 may be supplied with a layer of adhesive through the instrumentality of a distributing roller 23 operating in conjunction with an adhesive supply tank 24. A guide roller 25 lays the material of lamination 3 on the web 1, and after passing said guide roller 25 the superimposed laminations 1 and 3 have pressure applied to them by a suitable pressure and feed roller 26 which rotates at the same peripheral speed as the speed of movement of the traveling table 21.

Any desired number of laminations may be successively laid on the board to build up the required strength, and by way of illustration, the apparatus diagrammatically represented in Fig. 6 has been shown as applying a third lamination 27 on top of the plain lamination 3. Said lamination 27 may also be fed in web form from a suitable stock supply, and it may have its inner or lower surface supplied with adhesive, in a manner similar to web 3, from an adhesive tank 28, and thereafter it may be guided to its superimposed position on lamination or web 3 by means of a guide roll 29. After passing the guide roll 29, this third lamination 27 may be pressed by a feed roller 30 which assists in producing a firm and uniform bond between the several laminations and it is to be noted that when the board is acted upon by the rollers 26 and 30, it is firmly supported throughout its width by the continuously traveling table 21. Any suitable material may be supplied from the tanks 24 and 28, dependent to some extent upon the nature of the material of the laminations, and in some instances, such as for the securement of paper board, a quick drying adhesive may be used. Sodium silicate is one of the available and desirable adhesives for this purpose, it being cheap, and it quickly sets to a hardness far beyond that of the paper board or like material. The adhesive itself imparts added stiffness to the superimposed laminations. It is of utmost importance that a permanent union or bond be established between the respective laminations, and in order to facilitate such a bond, particularly when sheet metal is used, the surfaces of the metal should be clean before application of the adhesive which should have little water content and be applied in a very thin film.

As the fabricated web leaves the traveling table 21 its stiffening flutes 4 are successively released, and it may then pass over a set of fixed, longitudinally extending rails 31, adjacent the delivery end of which is a knife 32, or the like, by means of which the web may be cut into boards of desired length. The boards so produced may then be supplied with adhesive on their fluted surfaces in any desired manner, and arranged in pairs as shown in Figs. 8 and 9 to produce a complete board with the desired substantial cells 6. Preferably the fluted board units may be sprayed with adhesive from a supply pipe 33 while passing over the rails 31 and prior to the cutting-off operations. Said pipe 33 has been shown in Fig. 6 as delivering a spray 34 of adhesive upwardly against the surface of the traveling composite web, and it may have associated with it a drip pan 35. Instead of cutting off the board units 10 and then securing them in opposed relation, it is obvious that two sets of mechanism as above described may be disposed in juxtaposition, and so related as to produce the complete board with air cells prior to cutting off.

Sheet materials which are too stiff to be handled in a stock roll, may be fed in flat condition, such as from a magazine or by hand, and in the event that the outer laminations are of metal or other relatively hard material, they may be slightly spaced apart to permit easy cut-off, between them, of the intermediate laminations.

In Fig. 10 certain portions of the apparatus have been shown in more detail than in Fig. 6, and here a modified arrangement of the parts has been shown. The web 20 is fed from a stock roll 20—a and the web 3 fed in a manner similar to the disclosure in Fig. 6. This specific embodiment of the apparatus is adapted for the production of a fabricated board such as that shown in Fig. 1, and instead of laying the third web on top of the lamination 3, it applies it to the fluted side of the web. This third web 2—a of sheet material is fed from a stock roll 36, mounted below a stationary table portion 37, upwardly past the adhesive supplying means 38 and over a guide roller 39 between the delivery end of the movable table 21 and the receiving end of the fixed table portion 37. Thus the web 2—a becomes secured to the extremities of the stiffening flutes 4, the union being augmented by pressure of a roller 40 which works in opposition to the table portion 37. Thereafter the fabricated web travels along the table 37 sufficiently to permit the proper setting of the adhesive, after which it may be cut into board lengths, preferably as previously described.

Referring now more particularly to Figs. 10, 13, 14, 15, and 16, the improved mechanism will be described in more detail. The continuously moving table 21 includes a plurality of relatively movable members between which the deflected portions of the web 20 are adapted to be received and held during the securement of the superimposed laminations. In the specific form of movable table illustrated, said relatively movable members are in the form of links 42 pivotally connected at 43 to intermediate links 44 in such a manner as to form a plurality of endless chains 45. Said chains 45 run over sprocket wheels 46 and 47 on spaced shafts 48 and 49, and the horizontal runs of the chains are prevented from sagging by fixed supports 50 and 51. The shafts 48 and 49 are rotatably mounted in frame bearings 52 at opposite sides of the machine, and they have their respective sprocket wheels 46 and 47 keyed to them for simultaneous rotation. Any desired number of such sprocket wheels may be used, dependent upon the width of sheet material contemplated, and in Fig. 14, four such sprockets have been shown as mounted in spaced relation.

Each of the links 42 may be in the form of a flat plate having a pair of spaced portions 53 and 54 extending radially away from the axes of rotation of the sprockets, and each of said portions 53 and 54 having inwardly deflected parallel ears 55 and 56. Resiliently mounted on each of the links 42 are angle bars 57 and 58 which extend longitudinally from one side of the machine to the other side as best shown in Fig. 14. The flange portions 59 of said angle bars preferably bear upon the outer edges of the link portions 53 and 54, while their flange portions 60 are received in grooves 61 between the adjacent links 42. In order to attach the angle bars to the links of the chains 45, each of the flanges 60 is provided with lateral studs or guide pins 63 so disposed as to be capable of seating in apertures 64 in the respective ears 55 and 56, and each of said studs 63 carries an abutment for one end of a compression spring 65 confined between said ears. Thus the angle bars 57 are normally spring pressed toward the angle bars 58 of the adjacent links, yet said angle bars are capable of yielding separation. As the chains pass around the sprocket wheels 46 and 47, the links 42 maintain radial positions with reference to the respective shafts 48 and 49, resulting in the separation of the cooperating angle bars as at 66, and as the links go off tangent from the sprockets said separation is taken up to form the continuous table 21.

Just prior to the closing up of the spaces 66 between the adjacent links, portions of the web 20 are deflected into them by means of an intermittently operating mechanism 67, which comprises a transversely extending deflector bar 68 carried at the ends of swinging arms 69, which are secured to a supporting rod 70 above the movable table 21. Adjacent each end of the rod 70 is an adjustable actuating arm or lever 71 normally disposed in the path of projecting lugs 72 on the outer links 42, the arrangement being such that as the successive lugs 72 engage the ends of the levers 71 they cause the rod 70 to rock in a counter clockwise direction, as viewed in Fig. 13, and moving the deflector bar into the space 66 nearest the point of tangency. As the effective lug 72 passes beyond the lever 71, said rod and associated parts are returned to their normal positions by tension springs 73, and the adjacent bars 57 and 58, between which the web has been deflected, move together with a crimping action to form the flutes 4. This grip on the deflected portions of the sheet material is firmly maintained throughout the length of the movable table 21, and is automatically released as the chain links pass over the sprockets 47. Associated with the deflecting mechanism are a plurality of endless friction belts 14 running over pulleys 75 and 76, as clearly shown in Fig. 13, and in such a manner as to firmly hold the sheet material web 20 against displacement between the actuation of the bar 68 and positive gripping of the deflected portions. In order to avoid interference, the bar 68 may be provided with notches 77 through which the lower runs of the belt 74 operate when the deflector bar is tripped.

By virtue of the yielding connection of the angle bars 57 and 58 with the chain links, it will be evident that variations in the thickness of the sheet material will be automatically compensated for. As has previously been stated, the web 20 may be transversely scored at desired intervals to define lines of weakness for bending the sheet into spaces 66, but such initial scoring is not necessary for all materials.

In Fig. 17 another modified form of the invention has been illustrated wherein the traveling table 21 is formed of connected links 42a and 44 to provide endless chains as in the previous disclosure. In this form of the invention, however, the yieldingly-mounted angle bars 57 and 58 have been replaced by inverted channel bars 80 which extend transversely of the table and are carried by the respective links 42a. Each of the channel bars 80 is provided with diverging side edge flanges 81, and the arrangement is such that these flanges 81 define V-shaped grooves 82 between the adjacent links 42a. When this form of apparatus is employed the stiffening flutes formed upon the fabricated board are in the nature of trusses, as best shown in Figure 2. Said stiffening flutes are designated generally by reference character 83, and each of said flutes 83 is formed by deflected portions 84 of the web 85. The portions 84 of the flutes extend angularly in straight planes and converge at a distance away from the original plane of the sheet, and as in the previous embodiment, the flutes are spaced apart to provide relatively straight portions 86 which are in a common plane. Any number of plain laminations of sheet material may be applied to the straight portion 86, and by way of illustration two such additional laminations 87 and 88 have been shown in Fig. 18. The superimposed sheets may initially be fabricated in the web formed as shown in Fig. 18, and cut into desired lengths, after which said boards may be secured together in pairs with their stiffening flutes disposed in opposed relation, as shown in Fig. 19. Here the extremities of the flutes 83 have been shown as secured to the flat portions 86 of the other lamination and staggered as desired to provide the substantial cells 89 for insulation purposes. The angular flutes 83 have a positive bracing effect which imparts great rigidity to the improved fabricated board and at the same time rendering it capable of production with less material, and therefore of less weight than prior art boards. In Fig. 20, the structure of the braced or trussed fabricated board has been shown on an enlarged scale to more clearly illustrate the adhesive joints. Here the inner laminations 85—a have been shown as being themselves initially formed of laminated stock and scored at 90 and 91 to facilitate the formation of the stiffening flutes 83. The subsequent bending of the stock on the score lines results in the formation of slight grooves into which the adhesive banks as at 92 and 93, the adhesive reinforcing the sheet stock at its weakened portions and forming a permanent interlock between the respective laminations.

It will be evident from the foregoing that improved articles of manufacture have been provided which are adaptable for use in many different ways, and that the improved methods and apparatus make possible the rapid and economical production of these improved boards. As has previously been stated, all of the laminations of a single board may be made of the same sheet material or they may be formed of different material, and in the event that the outer laminations are of metal, and the inner laminations of paper board or other fibrous sheet material, it will be possible to completely close the edges of each board with metal in such a way as to render the complete assemblage both fireproof and moisture proof. Dead air is a better insulating medium than circulating air, and therefore, when heat or sound insulation is desired with an air cell board, the edges may preferably be closed, regardless of what kind of sheet material is used.

While it has been stated that the improved boards may be used for certain specified purposes, their use is not restricted to these purposes, but may be extended to other arts wherein their characteristics may be advantageous. For example, it may be built up of dielectric material for use as an electric insulation, or it may be built up entirely of metal for the construction of interior walls and bulkheads in ships, and in some instances in place of leaving the various cells defined between the stiffening flutes empty they may be filled either with a heat insulating material or with a light weight strength-imparting material. The interior spacing, defined by the stiffening flutes, renders the improved boards capable of being easily joined together in edge-to-edge relation, with simple connecting members, such as tongues, corner angles or the like, mutually secured and concealed within said spacing of adjacent boards. Other modifications may be resorted to in the application of the invention to commercial practice, and the right is herein reserved to make such changes as fall within the scope of the appended claims without departing from the spirit of the invention.

Having thus described my invention, what I claim is:

1. As a new article of manufacture, a fabricated board comprising superimposed laminations of sheet material, one of said laminations having stiffening folds deflected from its original plane, said stiffening folds being self-sustaining and separated from each other by flat portions of the sheet which are in a common plane, and the other lamination having portions permanently secured to both the folded edges and the flat portions of said first mentioned lamination.

2. As a new article of manufacture, a fabricated board comprising mutually facing superimposed laminations of sheet material, each of said laminations having a plurality of folded bracing flutes extending away from the plane of the sheet, and flat portions in such plane, said laminations being permanently united, with their stiffening flutes extending in opposition from one lamination towards the other, the union being effected between the folded extremities of the flutes of one lamination and the flat portions of the other lamination.

3. As a new article of manufacture, a fabricated board formed of bendable sheet material, said sheet material having stiffening members extending from one of its surfaces, each of said stiffening members comprising angularly deflected portions of the sheet converging away from the sheet in fold lines at a substantial distance from the plane thereof, and means for connecting said stiffening members at their fold lines and for covering the spaces between them.

4. As a new article of manufacture, a fabricated board formed of superimposed laminations of bendable sheet material, two of said laminations facing each other and having at their mutually facing surfaces angularly deflected portions converging in fold lines at a substantial distance from their original planes, said angularly deflected portions of one lamination of the two being in opposition to those of the other lamination of the two and being permanently united to portions of said other lamination.

5. As a new article of manufacture, a fabricated board comprising superimposed laminations of sheet material permanently united in spaced relation, each of said laminations having a plurality of parallel stiffening folds projected out from the plane thereof and arranged in the space between such laminations in alternating opposition to similar folds of the other lamination, and means for restraining the so projecting and arranged stiffening folds from deformation.

6. As an article of manufacture, a fabricated board comprising superimposed laminations of sheet material permanently united together, one of said laminations comprising a series of trusses, and intermediate flat portions extending in one plane, and having original lines of weakness along angles of said trussed lamination, the resistance planes of each truss member emerging from the main body of such lamination and terminating at the edge of each truss member.

7. As an article of manufacture, a fabricated board including a lamination of sheet material comprising a series of trusses, and intermediate flat portions extending in one plane, and having original lines of weakness along angles of said trussed lamination, the resistance planes of each truss member emerging from the main body of such lamination and terminating at the edge of each truss member.

8. As an article of manufacture, a fabricated board including a sheet of paper with spaced integral folds extending from one face of the sheet, each of the folds having flat side walls lying to each side of a plane which extends perpendicularly to the board and through the tip of the fold.

9. As an article of manufacture, a fabricated board including a sheet of paper with spaced integral folds extending from one face of the sheet, each of the folds having flat side walls lying to each side of a plane which extends perpendicularly to the board and through the tip of the fold, and a sheet of paper adhered to the tips of the folds to form spaced air pockets of substantial size relatively to the thickness of the board.

10. As an article of manufacture, a fabricated board comprising mutually facing, superposed, laminations of sheet material permanently united in spaced relation, each of said laminations having spaced stiffening folds extending into the space between such laminations and arranged in alternating opposition to the folds of the other lamination, the folds defining between them substantial air cells which are invisible from the surface of the board.

GEORGE C. SNYDER.